United States Patent [19]
Funatsu

[11] Patent Number: 6,108,128
[45] Date of Patent: *Aug. 22, 2000

[54] BINOCULAR

[75] Inventor: Gouji Funatsu, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/933,361

[22] Filed: Sep. 18, 1997

[30] Foreign Application Priority Data

Sep. 20, 1996 [JP] Japan ................................. 8-271811

[51] Int. Cl.[7] .................................................. G02B 23/00
[52] U.S. Cl. .......................... 359/407; 359/416; 359/417
[58] Field of Search .................................... 359/407, 408, 359/412, 413, 418, 414, 415, 416, 417

[56] References Cited

U.S. PATENT DOCUMENTS

| | | | |
|---|---|---|---|
| 4,080,042 | 3/1978 | Hornschu et al. | 359/416 |
| 4,673,260 | 6/1987 | Steinberg | 359/418 |
| 5,071,242 | 12/1991 | Yangigama | 359/416 |
| 5,181,139 | 1/1993 | Benitez | 359/408 |
| 5,305,141 | 4/1994 | Hotta | 359/416 |
| 5,581,399 | 12/1996 | Abe | 359/410 |
| 5,640,271 | 6/1997 | Nishitani et al. | 359/412 |
| 5,729,384 | 3/1998 | Nishitani et al. | 359/412 |

FOREIGN PATENT DOCUMENTS

| | | |
|---|---|---|
| 727685 | 8/1996 | European Pat. Off. . |
| 8-36135 | 2/1996 | Japan . |

OTHER PUBLICATIONS

Minolta "Flat Binoculars", Leaflet, together with an English translation, May 1995.

Nikkei Mechanical No. 462, pp. 72–77, issued on Sep. 4, 1995, together with an English translation.

Primary Examiner—Cassandra Spyrou
Assistant Examiner—E. Cherry
Attorney, Agent, or Firm—Greenblum & Bernstein, P.L.C.

[57] ABSTRACT

A binocular includes two parallel telescope systems. First and second lens units belong to one of the telescope systems, so that the optical axis of the first lens unit is in line with the optical axis of the second lens unit. The first and second lens units are supported by first and second movable frames, respectively, which are supported by a common guide shaft extending in the direction of the optical axes.

22 Claims, 21 Drawing Sheets

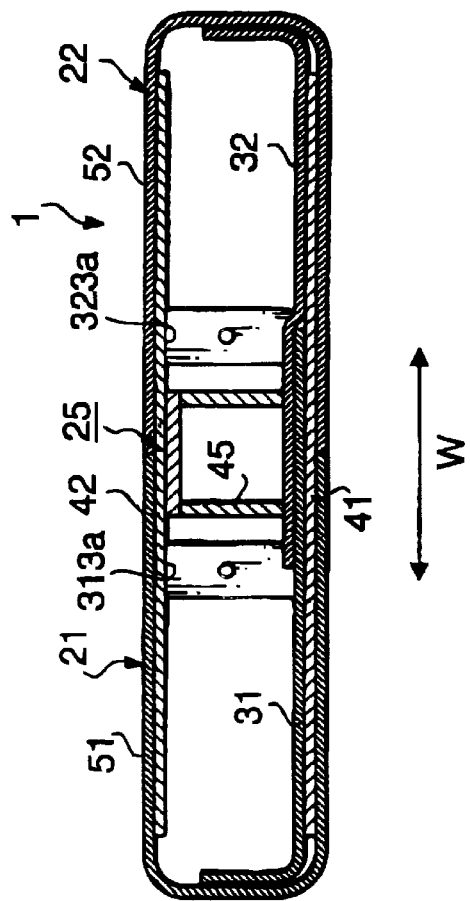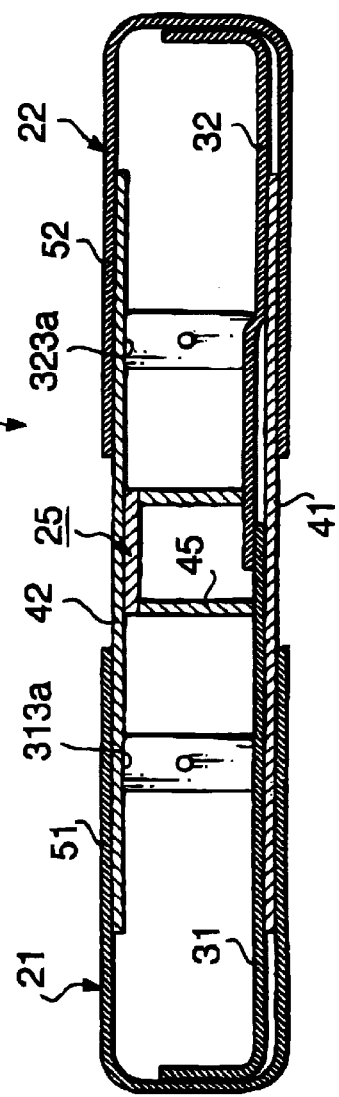

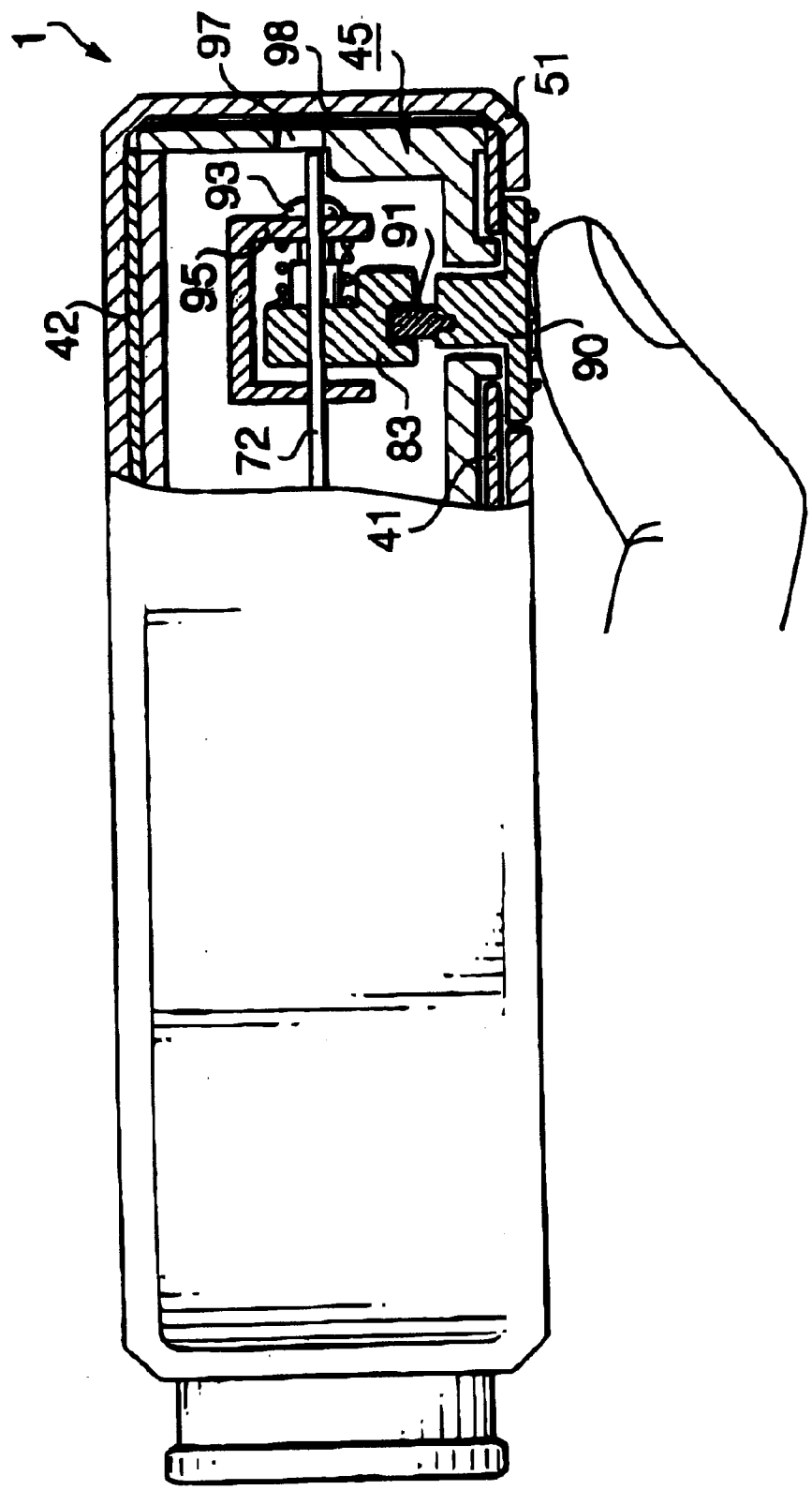

front ←→ rear

BINOCULAR

BACKGROUND OF THE INVENTION

The present invention relates to a binocular having a plurality of movable lens units which are a part of one telescope optical system.

There is a known binocular having a plurality of movable lens units which are part of one telescope optical system. These movable lens units are respectively moved for adjustment purposes such as focus adjustment, diopter correction or the like.

In such a binocular, due to movement of the movable lens units, misalignment of the optical axis of one movable lens unit with the optical axis of the other movable lens unit may occur. If such misalignment occurs, the performance of the binocular may be lowered.

SUMMARY OF THE INVENTION

It is therefore an object of the present invention to provide an improved binocular wherein the misalignment of the optical axes of the movable lens units is prevented.

According to an aspect of the present invention, a binocular includes two parallel telescope systems, a first lens unit and a second lens unit are part of one of the telescope systems (the optical axes of the first and second lens units being in parallel with each other). A first movable frame support, the first lens unit and is movable in the direction of an optical axis of the first lens unit, a second movable frame supports the second lens unit and is movable in the direction of an optical axis of the second lens unit, and a guide member supports the first and second movable frames. The guide member extends in the direction along the optical axis of the first lens unit.

With such an arrangement, since the first and second movable frames are supported by the common guide member extending in the direction along the optical axis, the misalignment of the optical axes of the respective movable lens units due to the movement thereof can be prevented. in a particular arrangement, the guide member includes a guide shaft. In such a case, at least one of the first and second movable frames is provided with a rotation preventing member for preventing the rotation of the movable frame about the guide shaft.

Preferably, the first lens unit belongs to an objective system of the telescope system. In particular, the first lens unit includes a front-most lens of the objective system. Further, the second lens unit includes an eyepiece system of the telescope system. In this case, it is preferred that diopter correction is performed by moving the first movable lens frame and focus adjusting is performed by moving the second movable lens frame.

According to another aspect of the invention, a binocular includes two parallel telescope systems, a first lens unit which is part of one of the telescope systems, a first movable frame supports the first lens unit and is movable in the direction of an optical axis of the first lens unit, a guide shaft extends in the direction along the optical axes for supporting the first movable frame, and a rotation preventing member is provided to the first movable frame. The rotation preventing member prevents the rotation of the movable frame about the guide shaft.

With such an arrangement, due to the rotation preventing member, the rotation of the movable frame about the guide shaft is prevented. Thus, the optical axis of the first lens held by the movable frame is not shifted by the rotation of the movable frame.

In a particular arrangement, the rotation preventing member is located at a distance from the guide shaft. It is possible to provide a rail member extending in parallel with the guide shaft. In this case, the rotation preventing member abuts the rail member. Further, the rotation preventing member is elastically deformed in a state the rotation preventing member abuts the casing, so as not to make a gap between the rotation preventing member and the rail member.

BRIEF DESCRIPTION OF THE DRAWINGS

FIGS. 8A and 8B are sectional views illustrating the movement of the casings;

FIG. 24 is a partially sectional view of the binocular.

DESCRIPTION OF THE PREFERRED EMBODIMENT

The present invention is described with reference to the preferred embodiment thereof.

Figure 1:
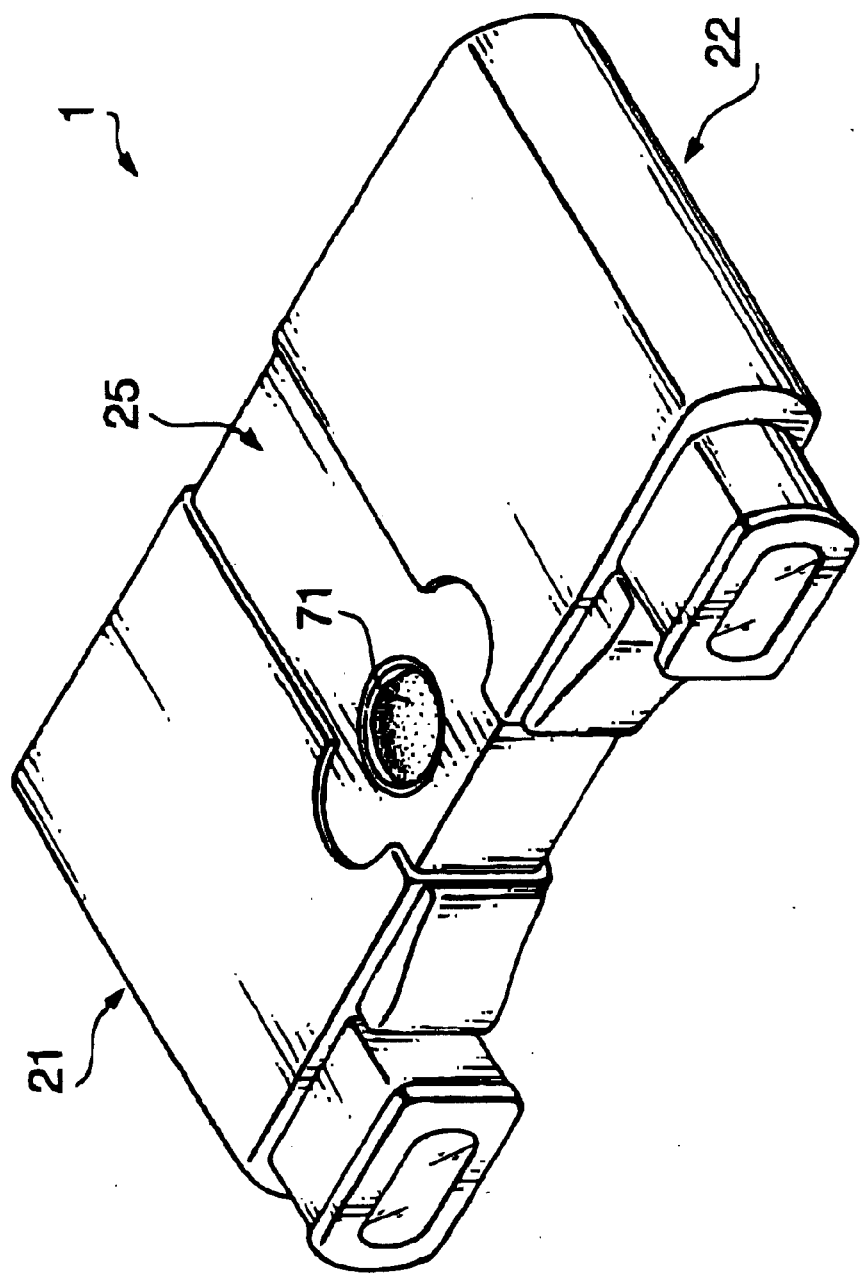
FIG. 1 is a perspective view illustrating a binocular of the embodiment.

FIG. 1 is a perspective view showing an external view of a binocular 1 according to the embodiment. The binocular 1 has left and right casings 21 and 22 and a support frame 25 which supports the casings 21 and 22.

Figure 2:
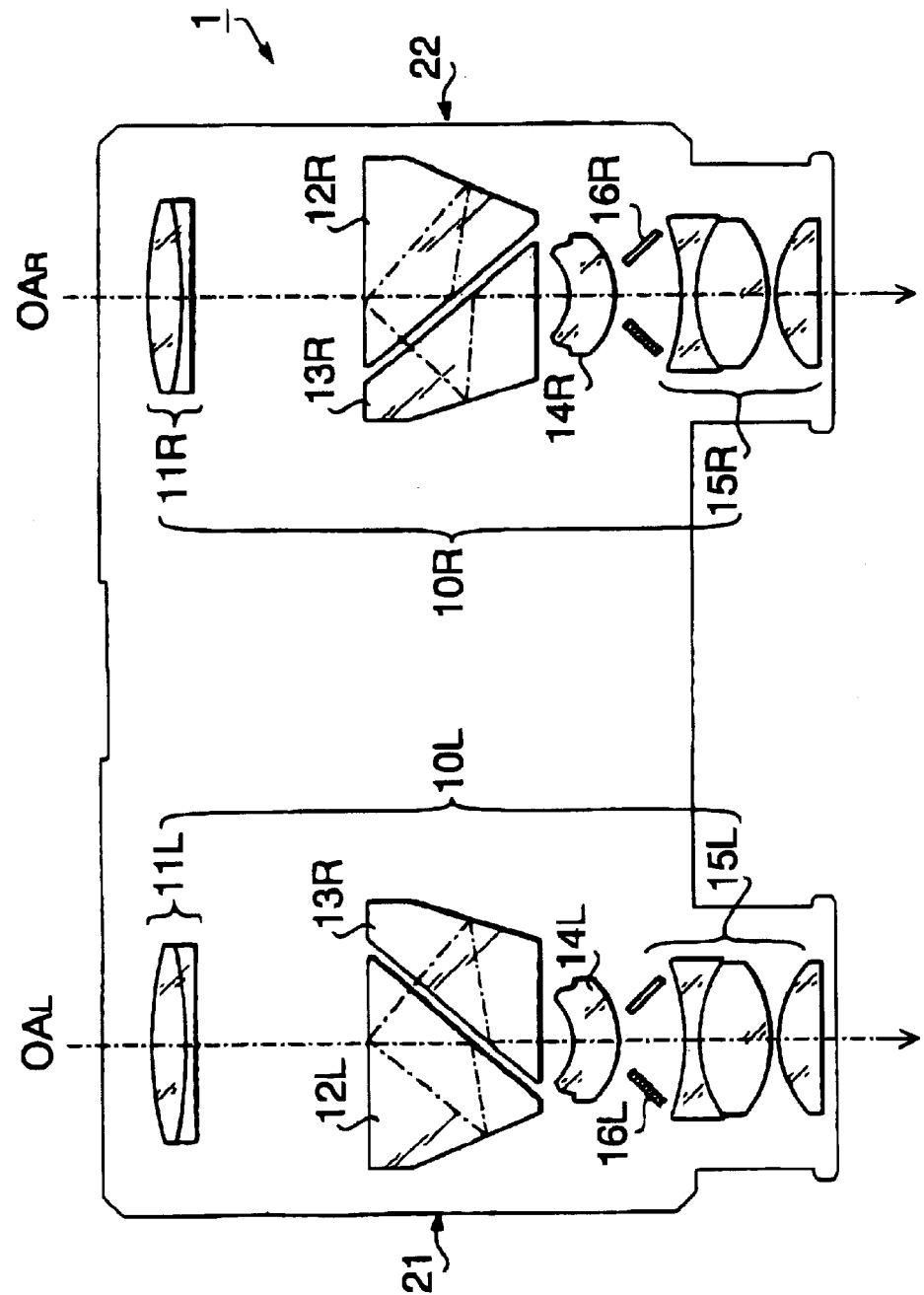
FIG. 2 is a plan view illustrating optical systems of the binocular of FIG. 1.

FIG. 2 shows the optical systems of the binocular 1. The binocular 1 includes left and right telescope systems 10L and 10R accommodated in the left and right casings 21 and 22, respectively. The binocular 1 is a so-called straight viewing type binocular in which the optical axis of an eyepiece system is in line with the optical axis of an objective system.

Since the telescope systems 10L and 10R are symmetrical with each other, the description will deal with the left telescope system 10L and the corresponding reference numbers for the right telescope system 10R will be shown in brackets.

The telescope system 10L (10R) includes first lens 11L (11R), auxiliary prism 12L (12R), roof prism 13L (13R), second lens 14L (14R), and eyepiece lens 15L (15R), which are arranged along an optical axis OAL (OAR). The first lens 11L (11R) and the second lens 14L (14R) constitute the objective system. The auxiliary prism 12L (12R) and the roof prism 13L (13R) constitute an erecting system. A field stop 16L (16R) is disposed where an image is formed by the objective system. The image formed by the objective system is magnified by the eyepiece lens 15L (15R) to be observed. Hereinafter, an objective system side of the binocular 1 is referred to as 'front', while an eyepiece side of the binocular 1 is referred to as 'rear'.

Figure 3:
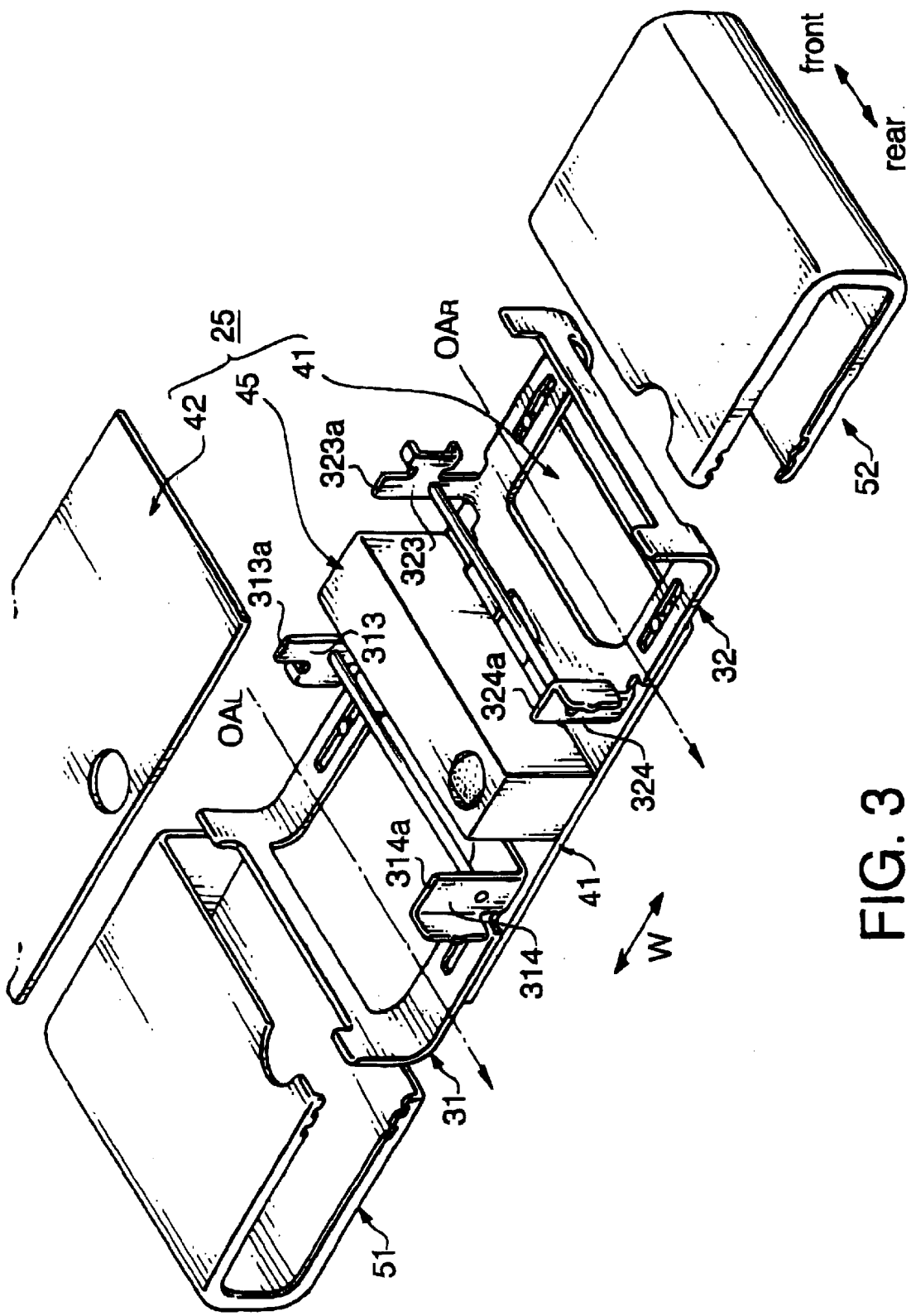
FIG. 3 is an exploded perspective view illustrating the frame structure of the of FIG. 1.

FIG. 3 is an exploded perspective view showing a frame structure of the binocular 1. The support frame 25 for movably supporting the casings 21 and 22 includes a bottom plate 41 and a top plate 42 disposed in parallel with each other, and a center block 45 disposed between the bottom and top plates 41 and 42. That is, the support frame 25 is I-shaped.

Left and right slide frames 31 and 32 are provided between the bottom plate 41 and the top plate 42, for supporting the lenses and prisms of the telescope systems 10L and 10R (FIG. 2) respectively represented by the optical axes OAL and OAR in FIG. 3. Left and right shells 51 and 52 are provided to the slide frames 31 and 32. The left slide frame 31 and the left shell 51 constitute the left casing 21 (FIG. 1), while the right slide frame 32 and the right shell 52 constitute the right casing 22 (FIG. 1).

Figure 4:
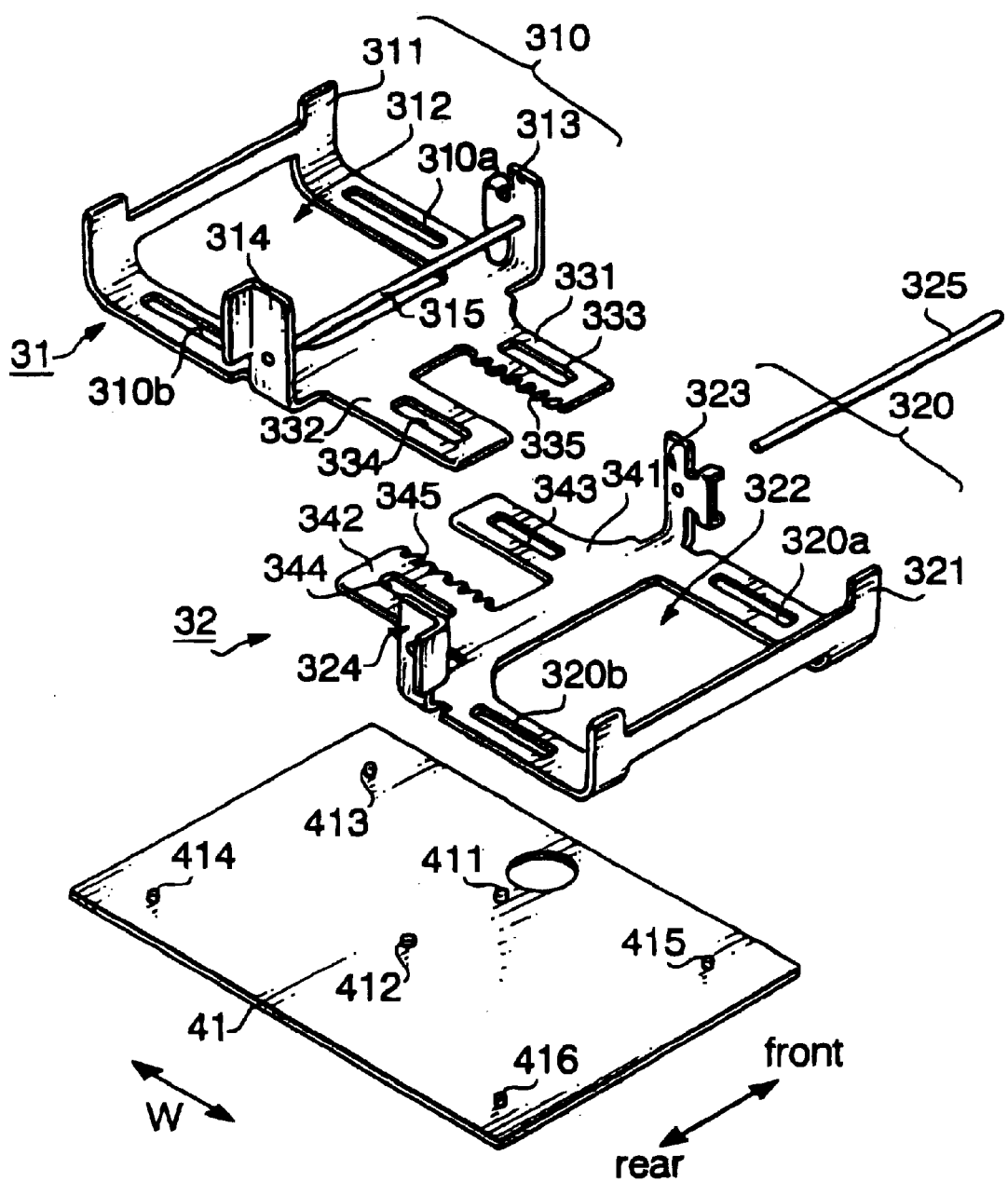
FIG. 4 is a perspective view of slide frames and a bottom plate.

FIG. 4 is a perspective view illustrating the left and right slide frames 31 and 32 and the bottom plate 41. Since the slide frames 31 and 32 are symmetrical with each other, the description will deal with the left slide frames 31 and the corresponding reference numbers for the right slide frames 32 will be shown in brackets.

The slide frames 31 and 32 are made of plate members with a rectangular openings 312 and 322 formed at centers thereof. A side end of the slide frame 31 (32) is bent upward so as to form side wall 311 (321).

Pillars 313 and 314 (323 and 324) are provided at a front end and a rear end of the slide frame 31 (32), and extend upward. The telescope system 10L (10R) is supported between the side wall 311 (321) and the pillars 313, 314 (323, 324). A guide shaft 315 (325) extends across the pillars 313 and 314 (323 and 324) of the slide frame 31 (32) in parallel with the side wall 311 (121). The guide shaft 315 (325) guides a movable unit along the optical axis as detailed below.

In order to guide the movement of the slide frame 31 (32), guide grooves 310a and 310b (320a and 320b) are formed in the vicinities of the front end and the rear end of the slide frame 31 (32), and extend in the width direction W of the binocular. Pins 413, 414, 415 and 416 are provided (i.e., planted) at four corners of the bottom plate 41 so as to engage the guide grooves 310a and 310b and the guide grooves 320a and 320b, respectively. Due to the engagement of the guide grooves 310a, 310b, 320a and 320b with the pins 413, 414, 415 and 416, the slide frames 31 and 32 are movable only in the width direction W of the binocular.

Figure 5:
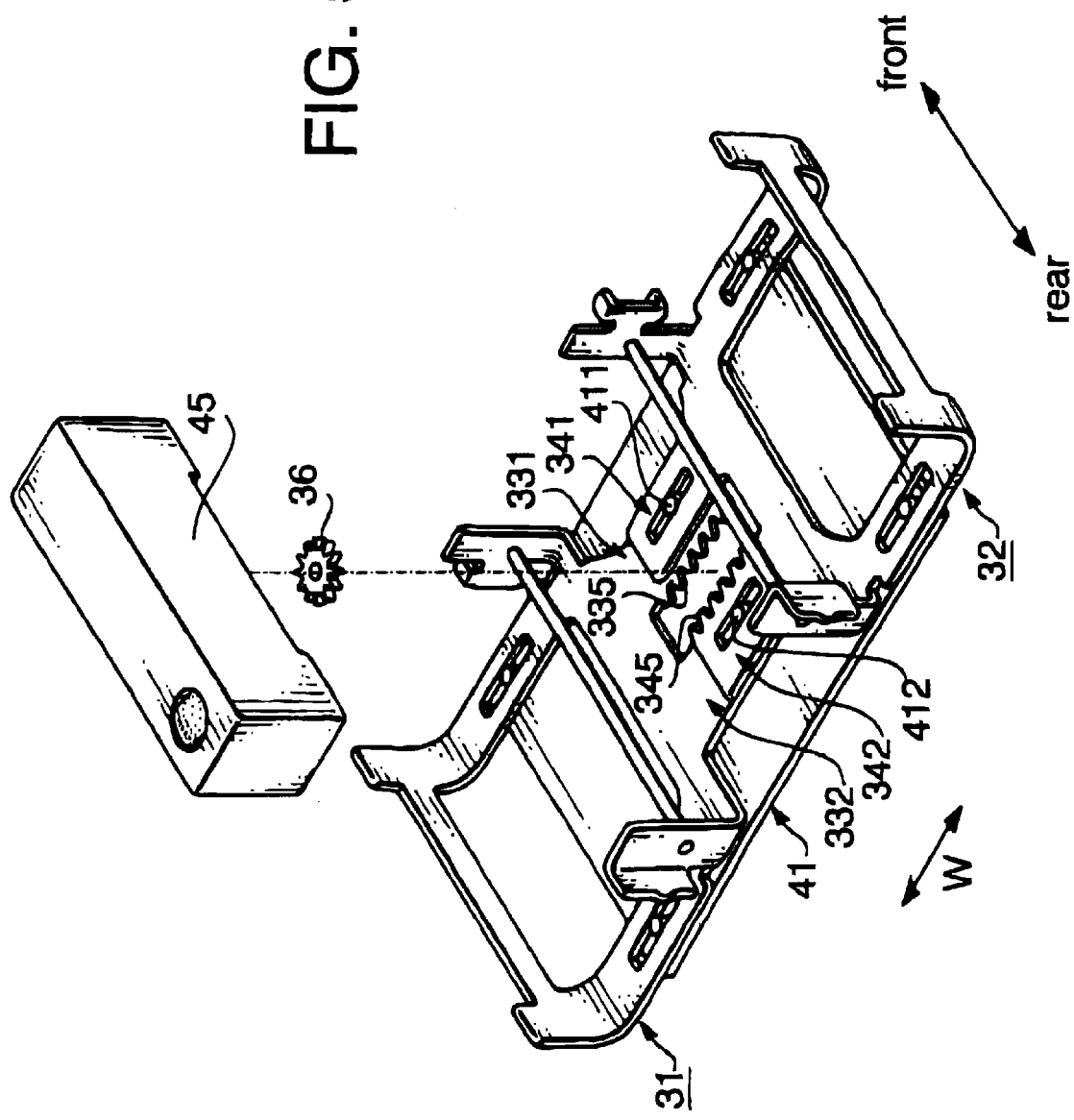
FIG. 5 is a perspective view illustrating the slide frames attached to the bottom plate.

For synchronizing the movement of the slide frames 31 and 32, a pair of extending portions 331 and 332 extend from the slide frame 31 toward the slide frame 32, and a pair of extending portions 341 and 342 extend from the slide frame 32 toward the slide frame 31. Engaging grooves 333 and 334 (extending in the width direction W) are formed in the extending portions 331 and 332, and engaging grooves 343 and 344 are similarly formed in the extending portions 341 and 342. As shown in FIG. 5, the extending portions 331 and 332 of the slide frame 31 and the extending portions 341 and 342 of the slide frame 32 overlap each other, above which the center block 45 is disposed. Racks 335 and 345 are formed on a front extending portion 331 of the slide frame 31 and an rear extending portion 342 of the slide frame 32 so as to be opposed to each other, and these racks 335 and 345 engage with a pinion 36 disposed on a bottom of the center block 45. By the engagement of the racks 335, 345 and the pinion 36, the slide frames 31 and 32 are moved symmetrically.

In order to determine the slidable amount of the slide frames 31 and 32, pins 411 and 412 project from the bottom plate 41 at the center, in the width direction W, of the binocular. The pin 411 engages the engaging grooves 333 and 343 and the pin 412 engages the engaging grooves 334 and 344. The grooves 333, 343, 334 and 344 have the same length, which determines the slidable amount of the slide frames 31 and 32.

As shown in FIG. 3, top end surfaces 313a and 314a (323a and 324a) of the pillars 313 and 314 (323 and 324) of the slide frame 31 (32) abut a bottom surface of the top plate 42. As a result, the vertical movement of the slide frames 31 and 32 are restricted by the bottom plate 41 and the top plate 42.

Thus, the slide frames 31 and 32 are supported by the I-shaped support frame 25 (consisting of the bottom plate 41, the top plate 42 and the center block 45), so that the slide frames 31 and 32 are slidable in the width direction W of the binocular.

Figure 6A:
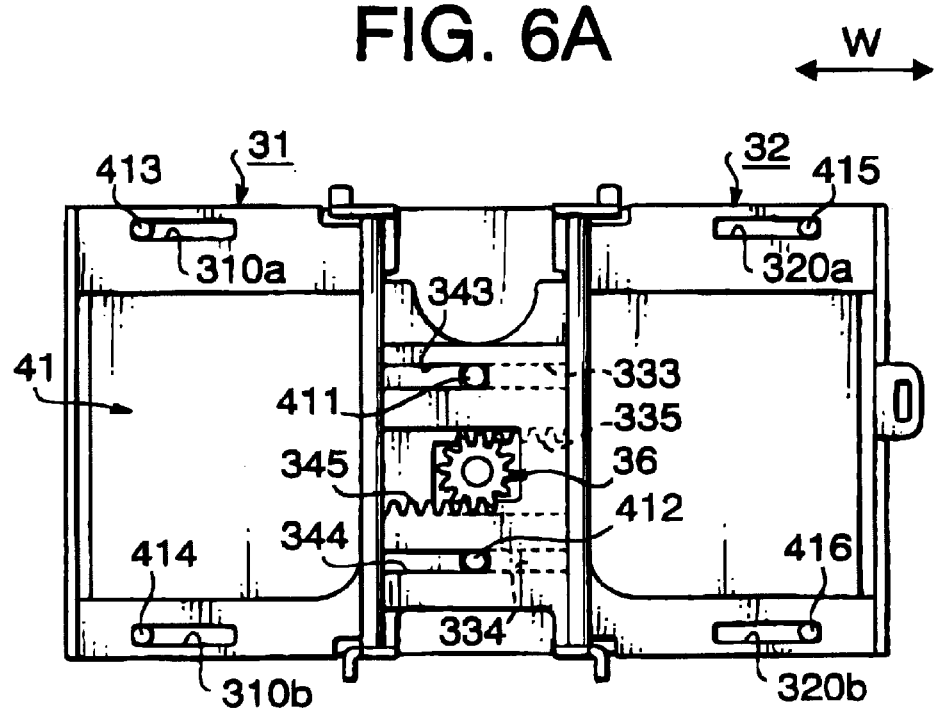
FIGS. 6A and 6B are plan views illustrating the movement of the slide frames.
Figure 6B:
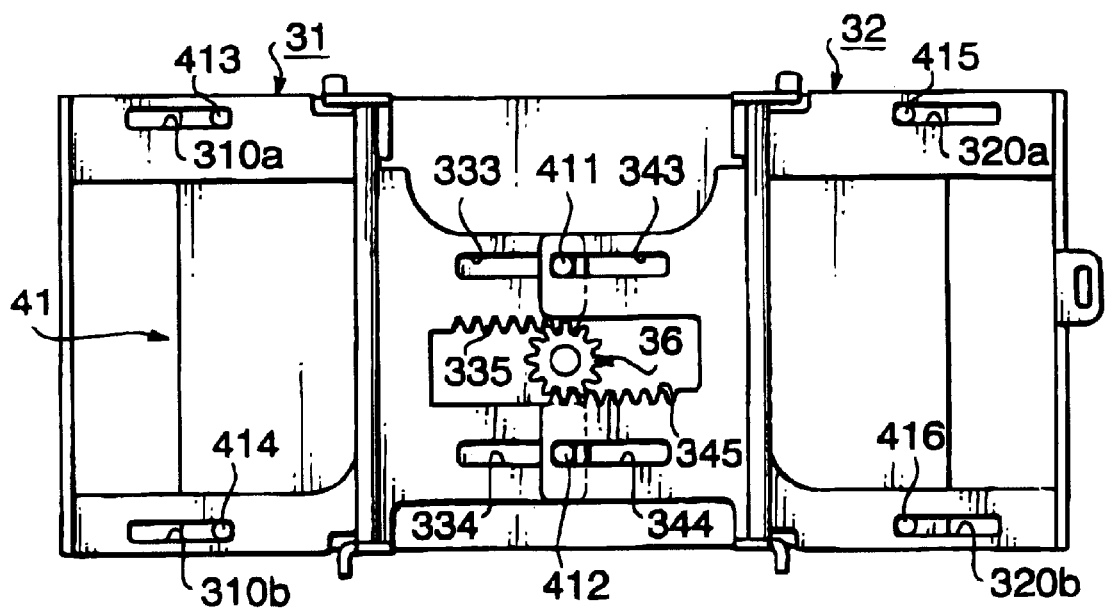

FIGS. 6A and 6B are plan views illustrating the movement of the slide frames 31 and 32. Due to the engagement between the pins 413, 414, 415 and 416 and the guide grooves 310a, 310b, 320a and 320b, the slide frames 31 and 32 are slidable only in the width direction W of the binocular. Further, since the pinion 36 engages with the racks 335 and 345 of the slide frames 31 and 32, the slide frames 31 and 32 are movable symmetrically with respect to the center of the width of the binocular as shown in FIGS. 6A and 6B.

The structure of the casing will now be described.

Figure 7:
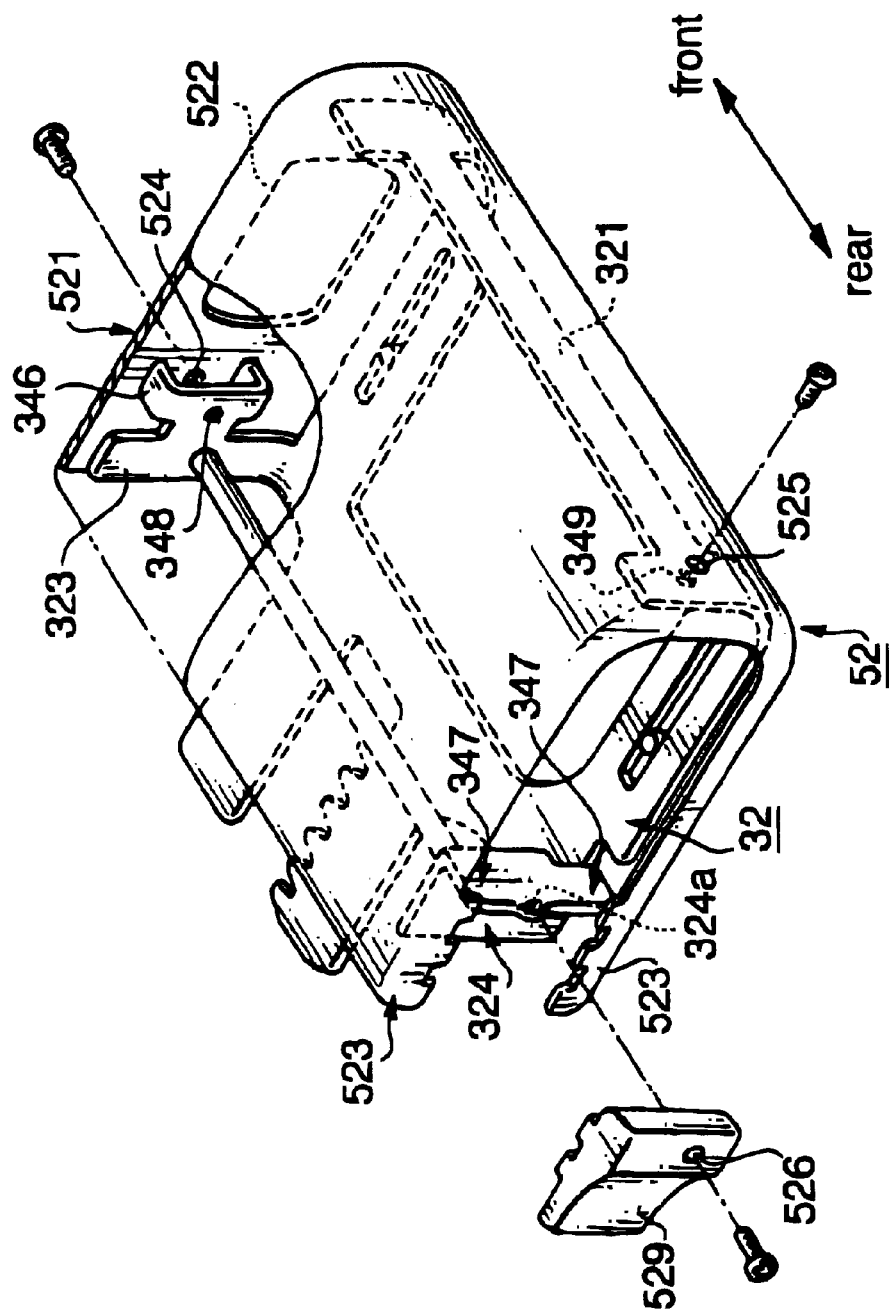
FIG. 7 is a perspective view illustrating a structure of a shell fixed to the slide frame.

FIG. 7 is a perspective view showing a structure of the right shell 52 attached to the right slide frame 32. The shell 52 is box-shaped, having an opening at the inner side end thereof. The shell 52 has a vertical wall 521 at a front end thereof, the vertical wall 521 has an opening 522 for allowing the incident light to pass through. A rear end of the shell 52 is fully open and has an peripheral portion 523 to which a rear end cover 529 is attached.

A front abutting portion 346 is protruded frontward from the front pillar 323, and abuts the wall 521 of the shell 52.

The rear pillar 324 is bent rearward so as to form a rear abutting portion 347 with upper and lower ends abutting the peripheral portion 523 of the shell 52. Further, a front threaded hole 348 is formed in the front pillar 323 and a though-hole 524 is formed in the shell 52 at a position corresponding to the threaded hole 348. Similarly, a rear threaded hole 324a is formed in the rear pillar 324 and a through-hole 526 is formed in a rear cover 529. A side threaded (or tapped) hole 349 is formed on the side wall 321 and a through-hole 525 is formed in the shell 52 at a position corresponding to the (threaded or) tapped hole 349.

As constructed above, the shell 52 is fixed to the slide frame 32 by abutting the front and rear abutting portions 346 and 347 to the wall 521 and the outer edges 523, and tightening screws into the threaded holes 348, 324a and 349. Thus, the slide frame 32 and the shell 52 are fixed at front, rear and side ends of the slide frame 32. Since the left casing 21 and the left slide frame 31 are fixed in a similar manner, the description thereof is omitted.

FIGS. 8A and 8B are sectional views showing the movement of the casings 21 and 22. The bottom plate 41 and the top plate 42 (FIG. 3) are disposed between the slide frames 31 and 32 and the shells 51 and 52 in the vertical direction. When the observer grips the shells 51 and 52 and pulls them in the width direction W of the binocular 1, the casing 21 (the slide frame 31 and shell 51) and the casing 22 (the slide frame 32 and shell 52) slide, supported by the bottom plate 41 and the top plate 42. The interpupillary distance a minimum in FIG. 8A and a maximum in FIG. 8B.

As constructed above, since the casings 21 and 22 consist of the slide frames 31 and 32 and the box-shaped shells 51 and 52, the casings 21 and 22 have high rigidity. Further, since casings 21 and 22 are supported by the I-shaped support frame 25 consisting of the bottom plate 41, and top plate 42 even when the interval between the casings 21 and 22 is extended to be at its maximum, the binocular 1 has high rigidity. The slide frames 31 and 32 and the shells 51 and 52 are made of metal, for further enhancing the rigidity of the left and right casings 21 and 22. Further, the bottom plate 41 and the top plate 42 are also made of metal, for further enhancing the rigidity of the binocular 1 as a whole.

The structure for supporting the lenses and prisms will now be described. The binocular of the embodiment is constituted so that the focus adjustment is performed by moving the lenses and prisms from the auxiliary prism 12L and 12R to the eyepiece lenses 15L and 15R frontward and rearward along the optical axes OAL and OAR (FIG. 2). The components to be moved for focus adjusting are referred to as movable units 6a and 6b, respectively.

Figure 9A:
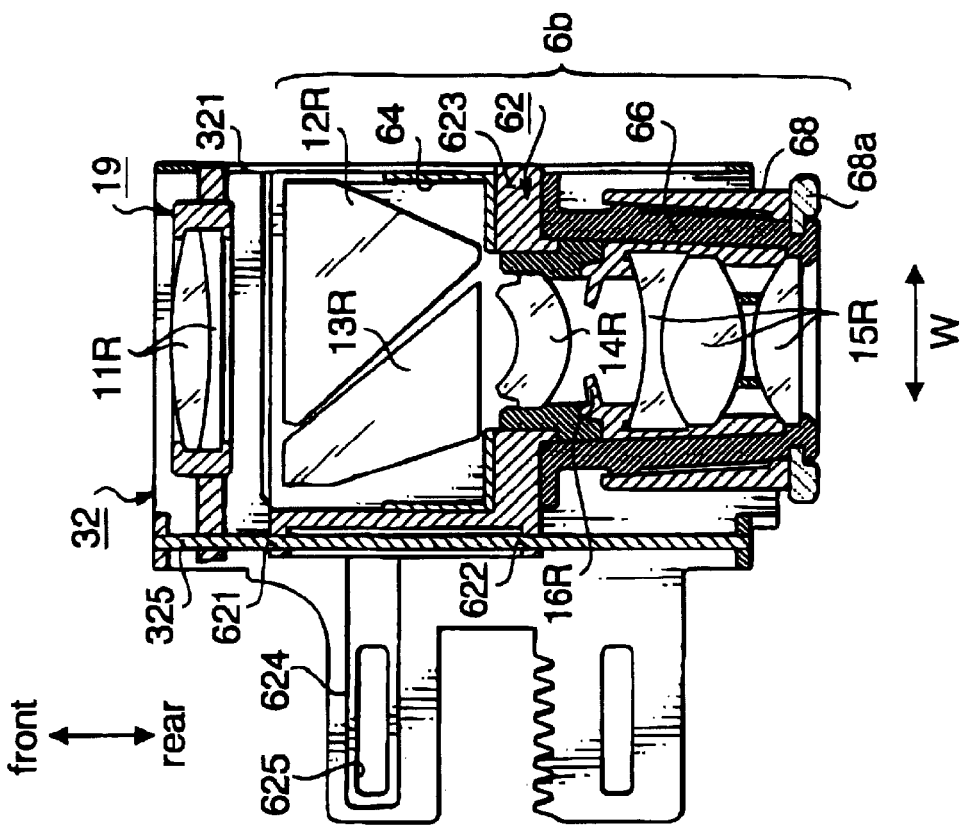
FIGS. 9A and 9B are plan views of movable units.
Figure 9B:
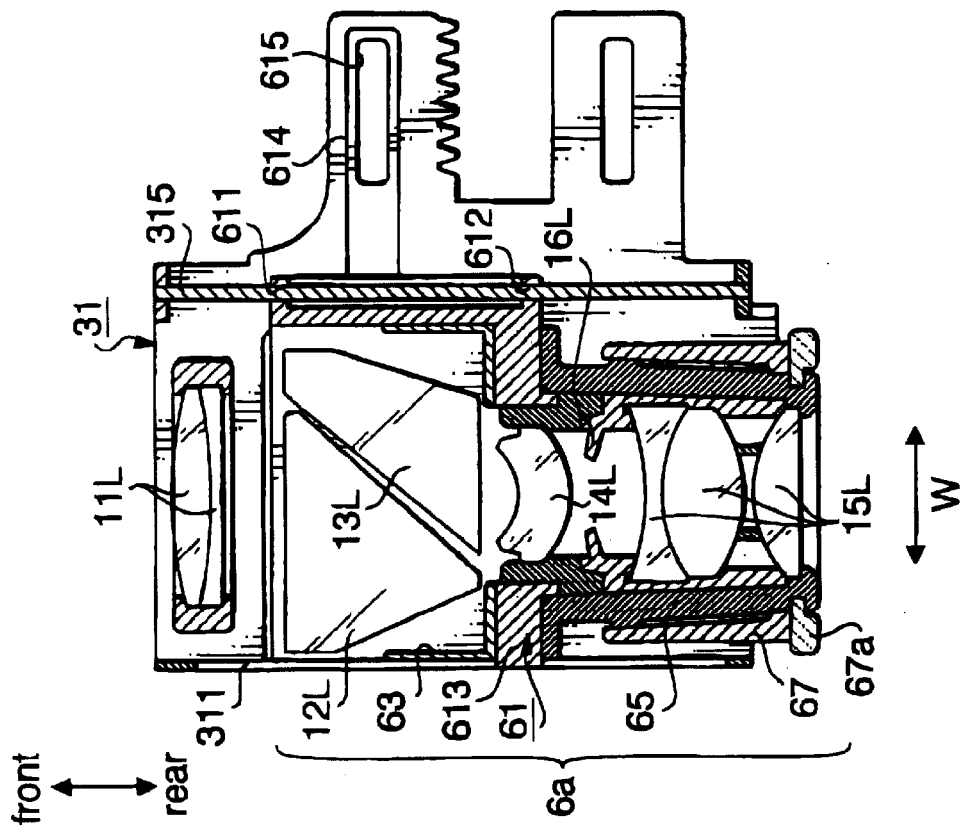

FIGS. 9A and 9B are plan views showing components held on left and right slide frames 31 and 32. As shown in FIGS. 9A and 9B, the left movable unit 6a (6b) includes a prism holder 63 (64) accommodating the auxiliary prism 12L (12R) and the roof prism 13L (13R), a lens holder 65 (66) accommodating the second lens 14L (14R) and the eyepiece lens 15L (15R), and a carrier 61 (62) carrying a prism holder 63 (64) and the lens holder 65 (66). Decorative rings 67 and 68 are provided around the lens holders 65 and 66. Rubber eyecups 67a and 68a are fitted to the tips of the decorative rings 67 and 68. With such an arrangement, the optical components from the auxiliary prism 12L and 12R to the eyepiece lenses 15L and 15R are supported by left and right carriers 61 and 62.

Since the movable units 6a and 6b are symmetrical with each other, the description will deal with the right movable unit 6b.

Figure 10:
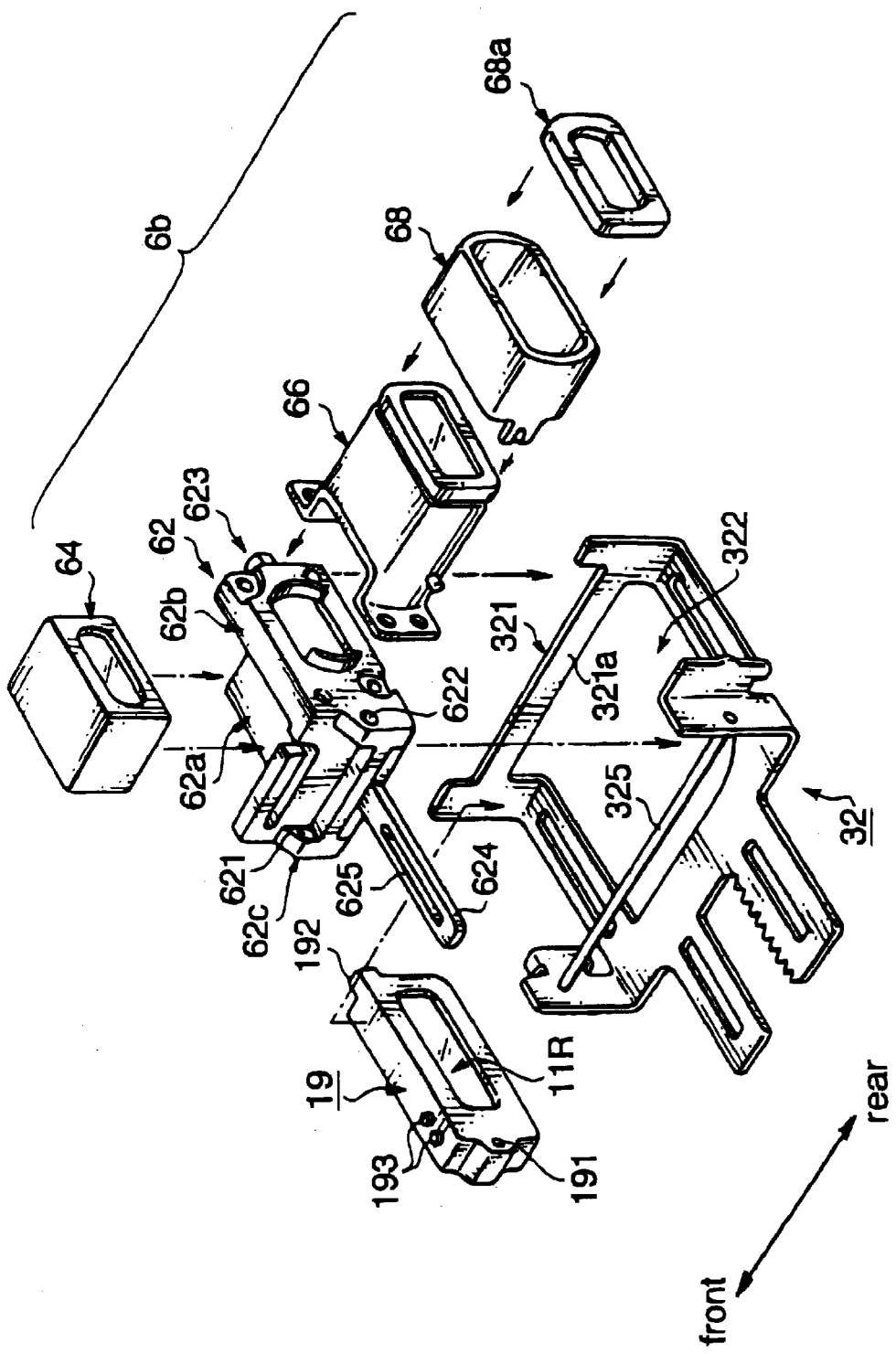
FIG. 10 is an exploded perspective view of a right movable unit.
Figure 11:
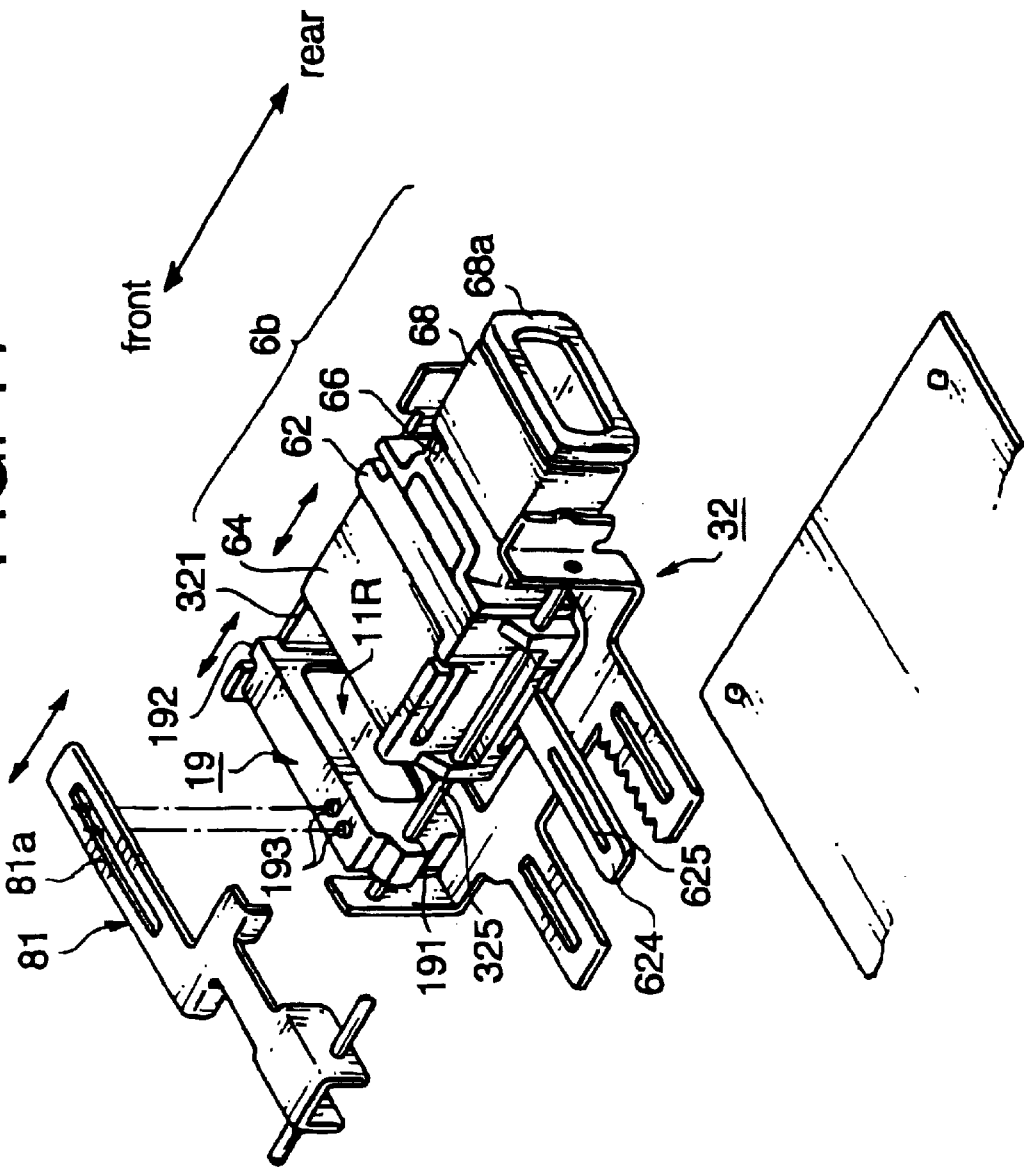
FIG. 11 is a perspective view of the right movable unit of FIG. 10.

FIGS. 10 and 11 are an exploded perspective view and a perspective view showing the structure for supporting the right movable unit 6b. As shown in FIG. 10, the carrier 62 includes a base plate 62a on which the prism holder 64 is placed. Two blocks 62b and 62c are respectively located at the rear and side ends of the base plate 62a so that the blocks 62b and 62c form an L-shape, as seen from above. The lens holder 66 is attached to the rear block 62b. The side block 62c is provided with through-holes 621 and 622 through which the guide shaft 325 is inserted. The rear block 62b is provided with a protection 623 which contacts the top of the side wall 321 of the slide frame 32. With such an arrangement, the movable unit 62 is movable frontward and rearward on the slide frame 32 as shown in FIG. 11.

Figure 12:
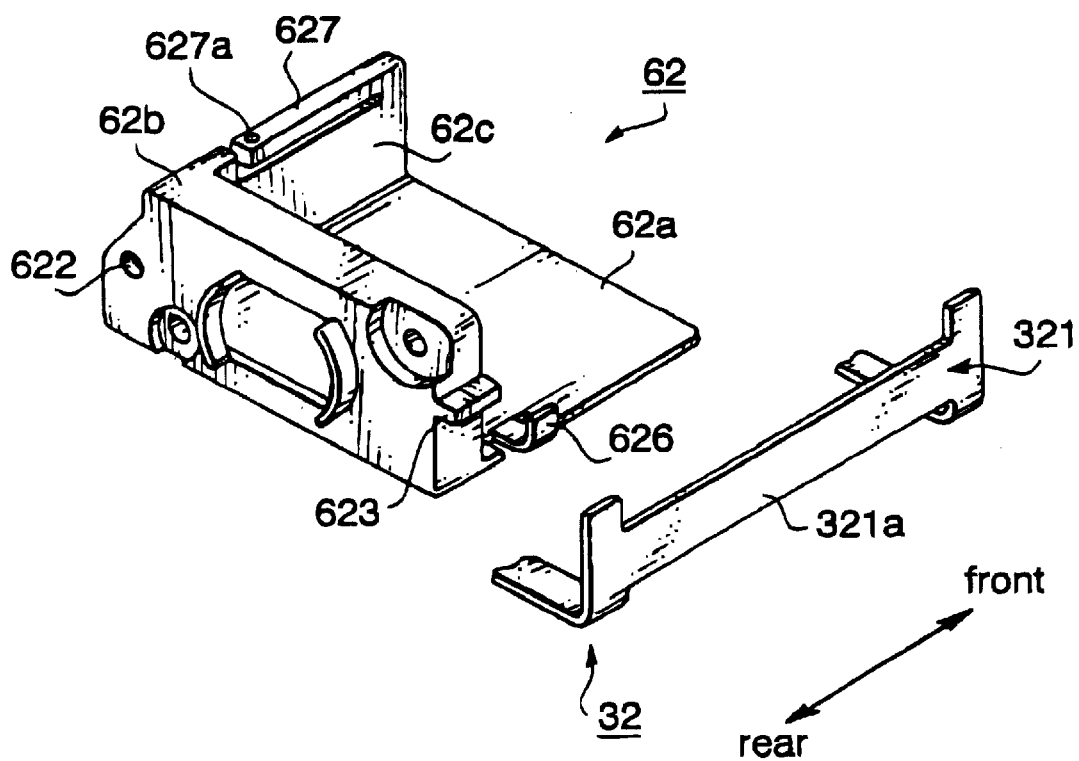
FIG. 12 is a perspective view of a carrier of the right movable unit of FIG. 10.

FIG. 12 is a perspective view of the carrier 62. As shown in FIG. 12, the side wall 321 of the slide frame 32 includes a rail portion 321a extending frontward and rearward alongside the carrier 62. The base plate 62a is provided with an abutting portion 626 at the right end thereof, which is bent and extended upward to abut the side wall 321 of the slide frame 32 from below. When the carrier 62 is mounted to the slide frame 32, the abutting portion 626 abuts the rail portion 321a from below, while the projection 623 contacts the rail portion 321a from above. In this state, the abutting portion 626 is elastically deformed, so as not to form a gap between the projection 623 and the rail portion 321a and a gap between the abutting portion 626 and the rail portion 321a. This arrangement prevents the rotation of the carrier 62 about the guide shaft 325.

In order to remove backlash due to the clearance between the guide shaft 325 and the through-hole 622 (621), the side block 62c is provided with a biasing lever 627 at the top thereof. The rear end of the biasing lever 627 is fixed to the side block 62c, while the front end thereof is a free end. The biasing lever 627 is provided with a protrusion 627a near the front end thereof. The protrusion 627a protrudes upward to abut the lower surface of the top plate 42 (FIG. 3). When the protrusion 627a abuts the lower surface of the top plate 42, the biasing lever 42 is elastically deflected downward, which removes the backlash due to the clearance between the guide shaft 325 and the through-hole 622 (621).

As shown in FIG. 11, in the front portion of the slide frame 32, the right first lens 11R is supported by a first lens frame 19 which is guided frontward and rearward by the guide shaft 325. The first lens frame 19 is moved frontward and rearward for the diopter correction (described below).

Thus, the first lens frame 19 (supporting the first lens 11R) and the carrier 62 (supporting the auxiliary prism 12R, the roof prism 13R, the second lens 14R and the eyepiece lens 15R) are linearly guided by the guide shaft 325 in the direction along the axis OAR. This arrangement prevents the misalignment of the optical axes of the lenses of the telescope system 10R due to the movement of the first lens frame 19 and the carrier 62.

The structure for driving the movable units is described. As shown in FIGS. 9A and 9B, an arm 624 will now be extended leftward from a left side of the carrier 62, and has an engaging groove 625 extending in the width direction W of the binocular. Similarly, an arm 614 extends rightward from the carrier 61, and has an engaging groove 615 extending in the width direction W of the binocular.

Figure 13:
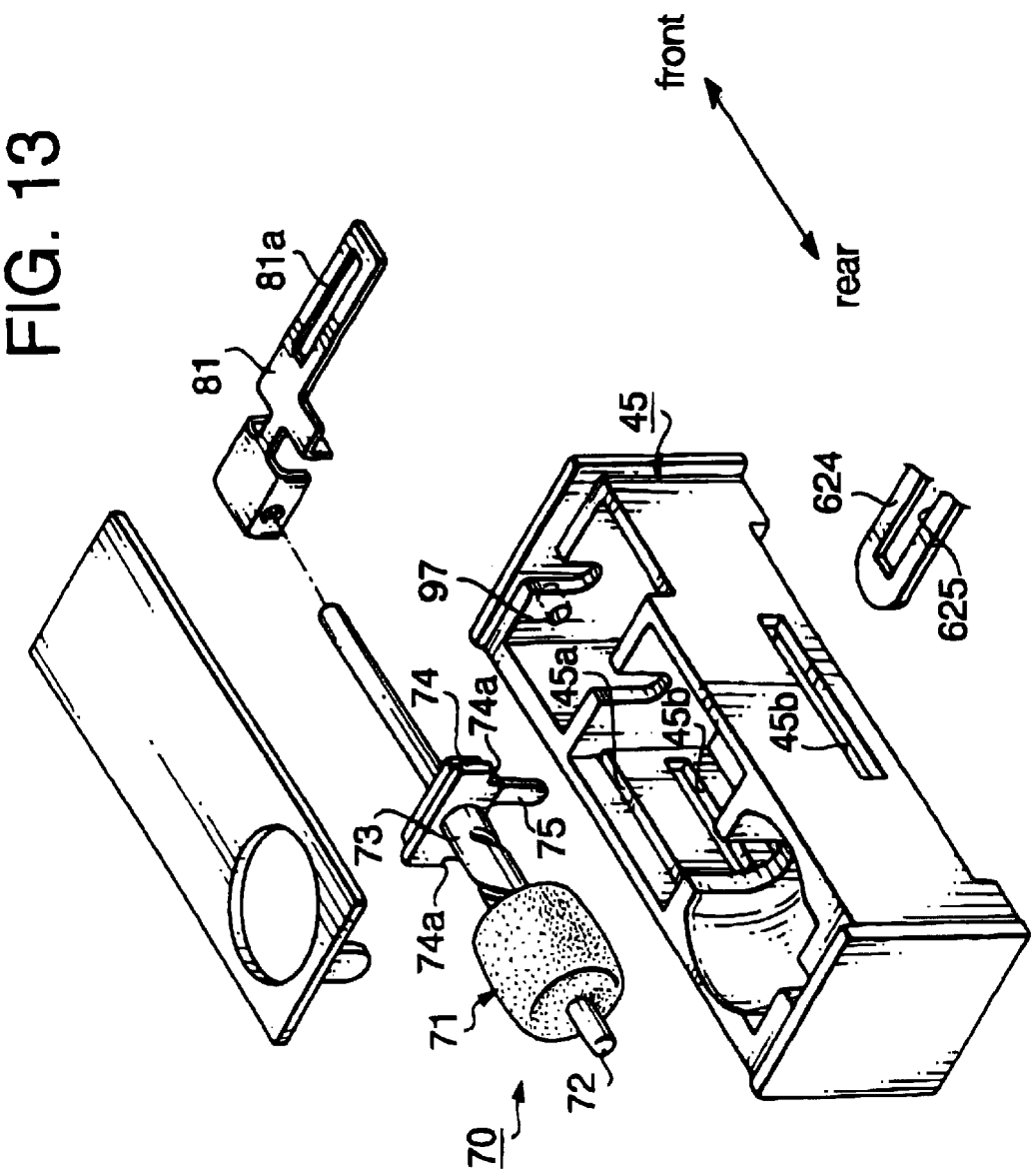
FIG. 13 is an exploded perspective view illustrating an operating portion.

FIG. 13 is a perspective view showing an operating portion 70 for driving the carriers 61 and 62. In the center block 45, the operating portion 70 includes a shaft 72 extending frontward and rearward and a focus adjusting knob 71 rotatably provided around the shaft 72. A screw 73 engages the focus adjusting knob 71 as detailed below, and is driven frontward and rearward by the rotation of the focus adjusting knob 71. A slider 74 is fixed to a tip of the screw 73, and has a lever 75 extending downward. The slider 74 has a pair of corner portions 74a which are slid on guide rails 45a formed in the center block 45 and guided frontward and rearward. Grooves 45b are formed on both sides of the center block 45, for inserting arms 614 and 624 of the carriers 61 and 62 into the interior of the center block 45. The lever 75 engages grooves 615 and 625 of the arms 614 and 624 which are inserted through the grooves 45b and 45b.

Figure 14:
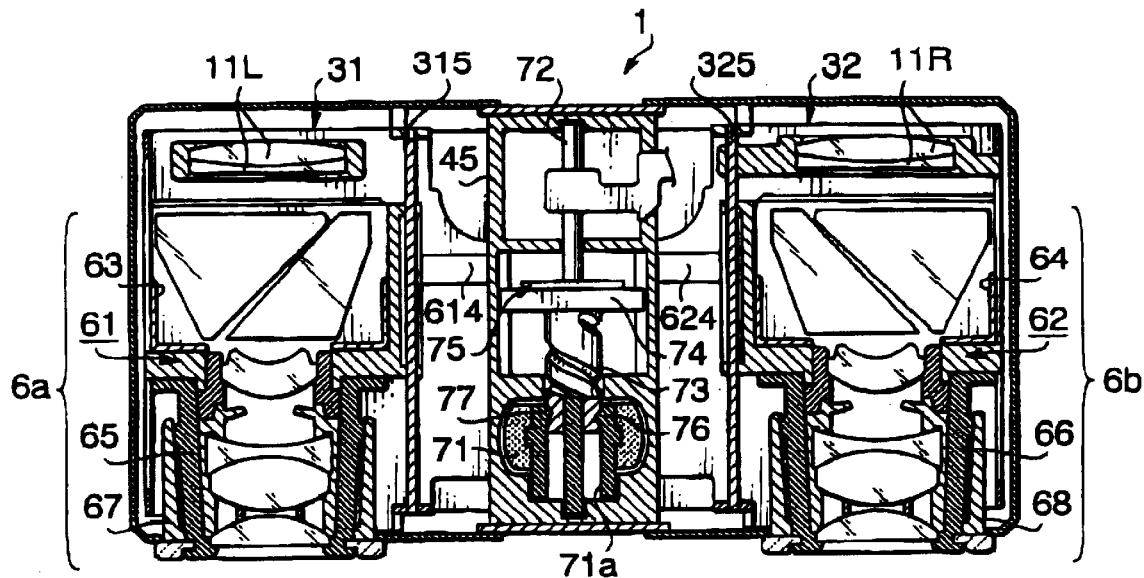
FIG. 14 is a plan view illustrating an internal structure of a binocular; in a collapsed position
Figure 15:
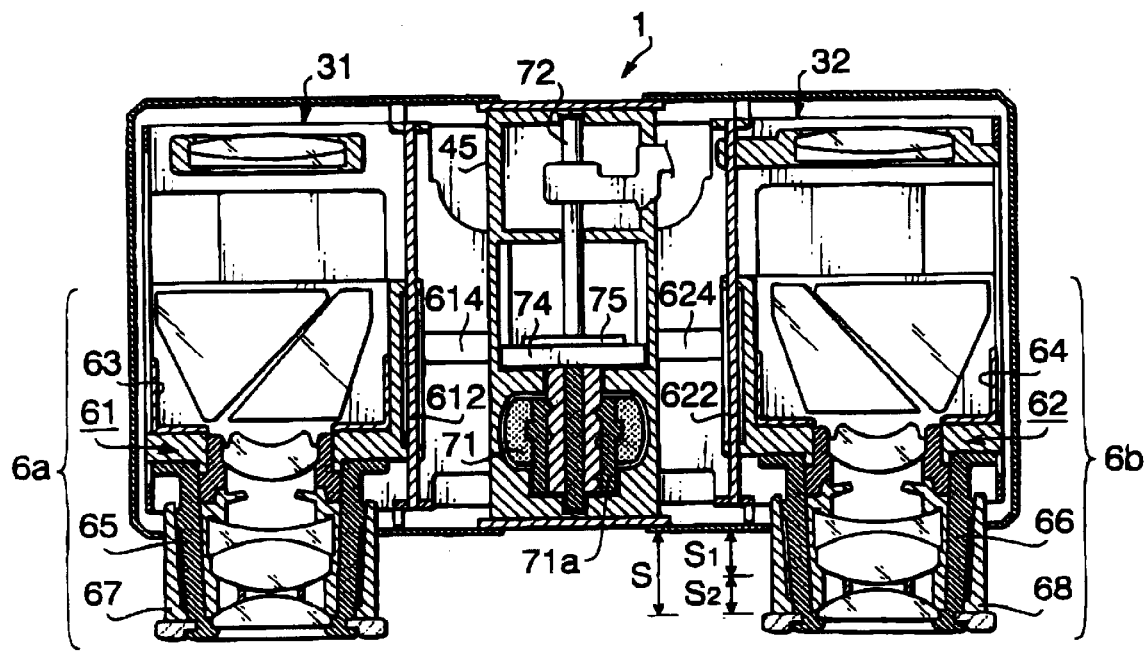
FIG. 15 is a plan view illustrating an internal structure of a binocular; in an extended position

FIGS. 14 and 15 are plan views showing an internal structure of the binocular. In order to transfer the rotation of the focus adjusting knob 71 to the linear movement of the screw 73, a driving ring 71a is provided in the focus adjusting knob 71, through which the screw 73 is inserted. The driving ring 71 has two protrusions 76 and 77 formed on an inner surface thereof, engaging threads of the screw 73. Thus, when the focus adjusting knob 71 is rotated, the screw 73 linearly moves. As a result, the arms 614 and 624 move frontward and rearward by way of the slider 74, thereby moving the carriers 61 and 62 frontward and rearward. The eyepiece portions of movable units 6a and 6b are fully accommodated in FIG. 14 and protruded in FIG. 15.

As shown in FIG. 14, the eyepiece portions can be fully retracted into the casings 21 and 22 for making the binocular compact when it is not used. The entire moving range (S) of each movable units 6a and 6b includes a first range (S1) for accommodating the eyepiece portion and a second range (S2) for focus adjustment. It is possible to observe an object via the telescope systems 10L and 10R (FIG. 2) only when the movable units 6a and 6b are in the second range. That is, when the movable units 6a and 6b are at a boundary between the first and second ranges an object at infinity can be observed. Thus, focus adjustment is performed by moving the movable units 6a and 6b in the second range. In particular, the entire moving range S is set to 11 mm, the first range S1 is set to 7 mm, and the second range S2 is set to 4 mm in the embodiment.

The arrangement to shift the moving speed of the movable units (with respect to the rotation of the knob) will now be described.

Figure 16:
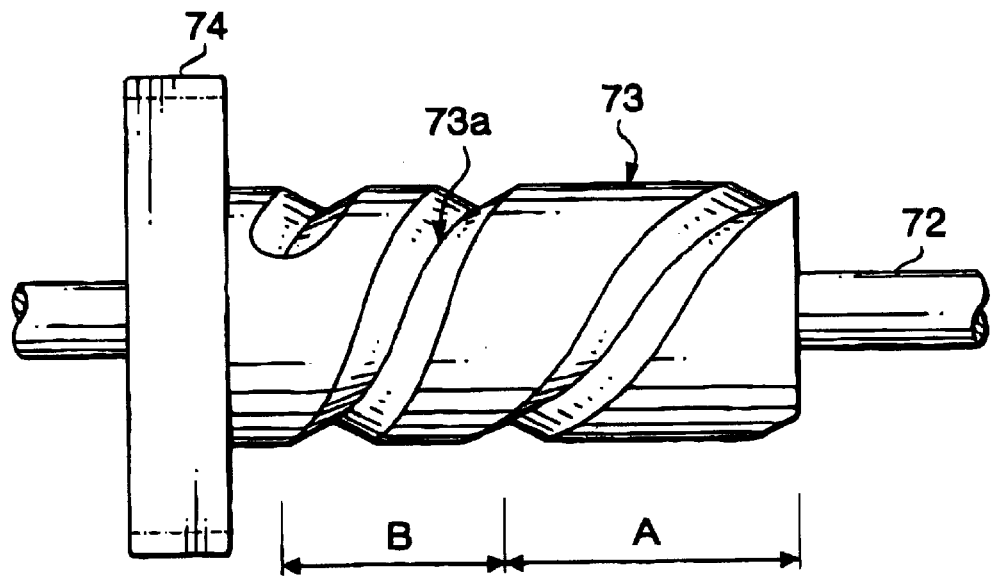
FIG. 16 is a plan view of a screw.
Figure 17:
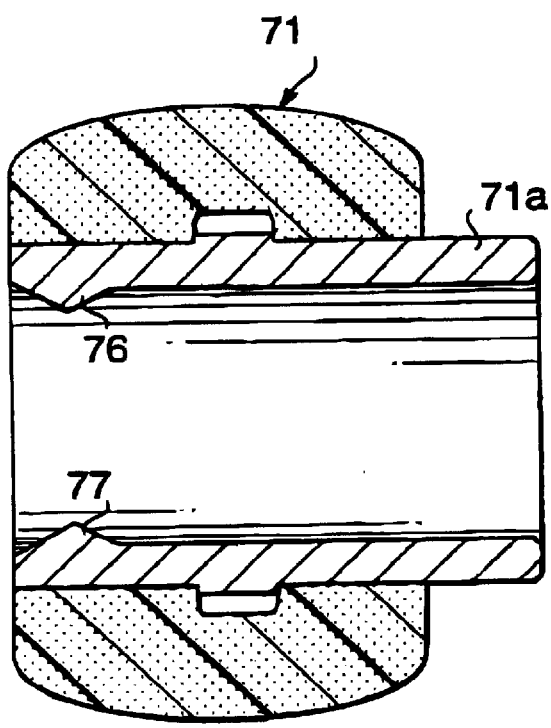
FIG. 17 is a sectional view of a focus adjusting knob.
Figure 18:
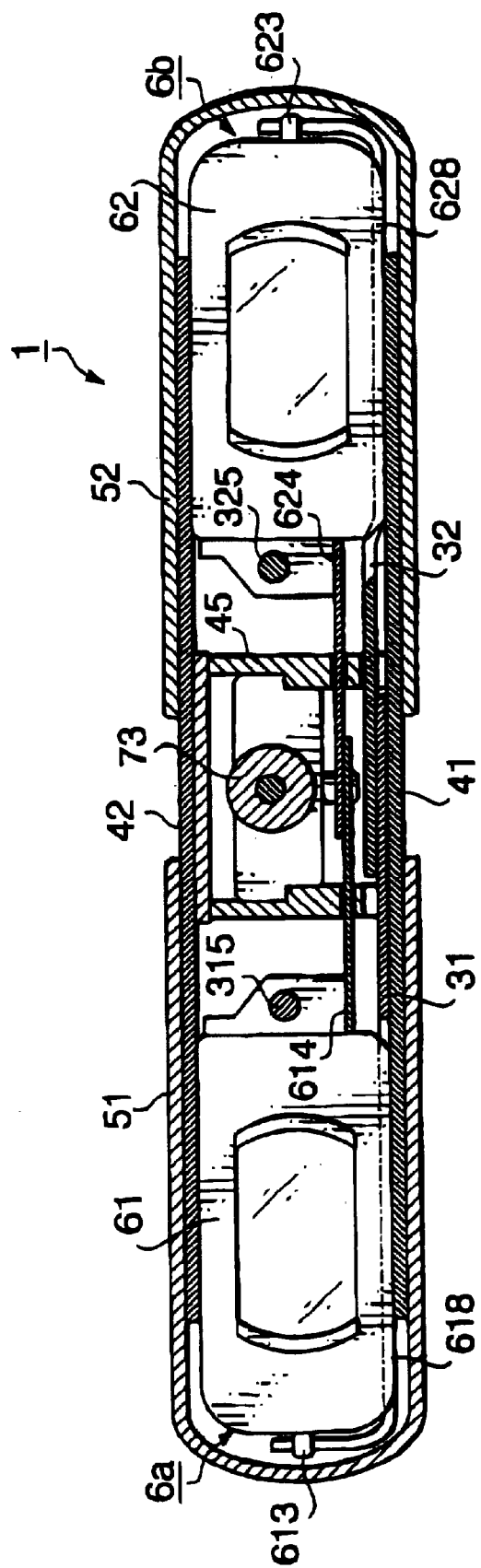
FIG. 18 is a sectional view of the binocular.

FIGS. 16 and 17 are a side view of the screw 73 and a sectional view of the focus adjusting knob 71. The screw 73 has a large lead (7 mm) at a portion A corresponding to the first range of the movable units 6a and 6b and a small lead (4 millimeters) at a portion B corresponding to the second range. The groove 73a of the screw 73 has a V-shaped sectional shape and the projections 76 and 77 of the driving ring 71a are conical-shaped. Thus, the projections 76 and 77 can slide smoothly even at a point where the lead of the groove varies. Accordingly, the movable units 6a and 6b are moved quickly in the first range, while the movable units 6a and 6b are moved slowly (and therefore accurately) in the second range. This enables quick accommodation of the eyepiece portions and accurate focus adjustment.

When the binocular is not used, the movable unit 6a and 6b are brought close to the first lenses 11L and 11R so that it is impossible to observe an object. That is, the binocular can have a smaller size in the direction along the optical axes. This feature enhances the portability of the binocular when it is not used. Further, since the accommodation of the eyepiece portions and the focus adjustment can be performed by a single mechanism, the entire structure of the binocular becomes simple.

The diopter correcting mechanism will now be described. The binocular of the embodiment is constructed so that the diopter correction is performed by moving the first lens 11R of one (right) objective system in the direction along the optical axis.

As shown in FIG. 11, the right first lens 11R is supported by a first lens frame 19 which is guided frontward and rearward by the guide shaft 325. On the other hand, as shown in FIG. 14, the left first lens 11L is fixed to the slide frame 31. In order to move the first lens frame 19, a blade member 81 is disposed on the center block 45 as shown in FIG. 13. As shown in FIG. 11, the first lens frame 19 has two pins 193 planted thereon (i.e. projecting therefrom), and the blade 81 has an engaging groove 81a engaging the pins 193. The engaging groove 81a extends in a width direction W of the binocular so as to ensure the engagement of the engaging groove 81 and the pins 193, allowing for the movement of the slide frame 32 caused by the interpupillary adjustment. With such an arrangement, the right first lens 11R is moved by moving the blade member 81.

Figure 19:
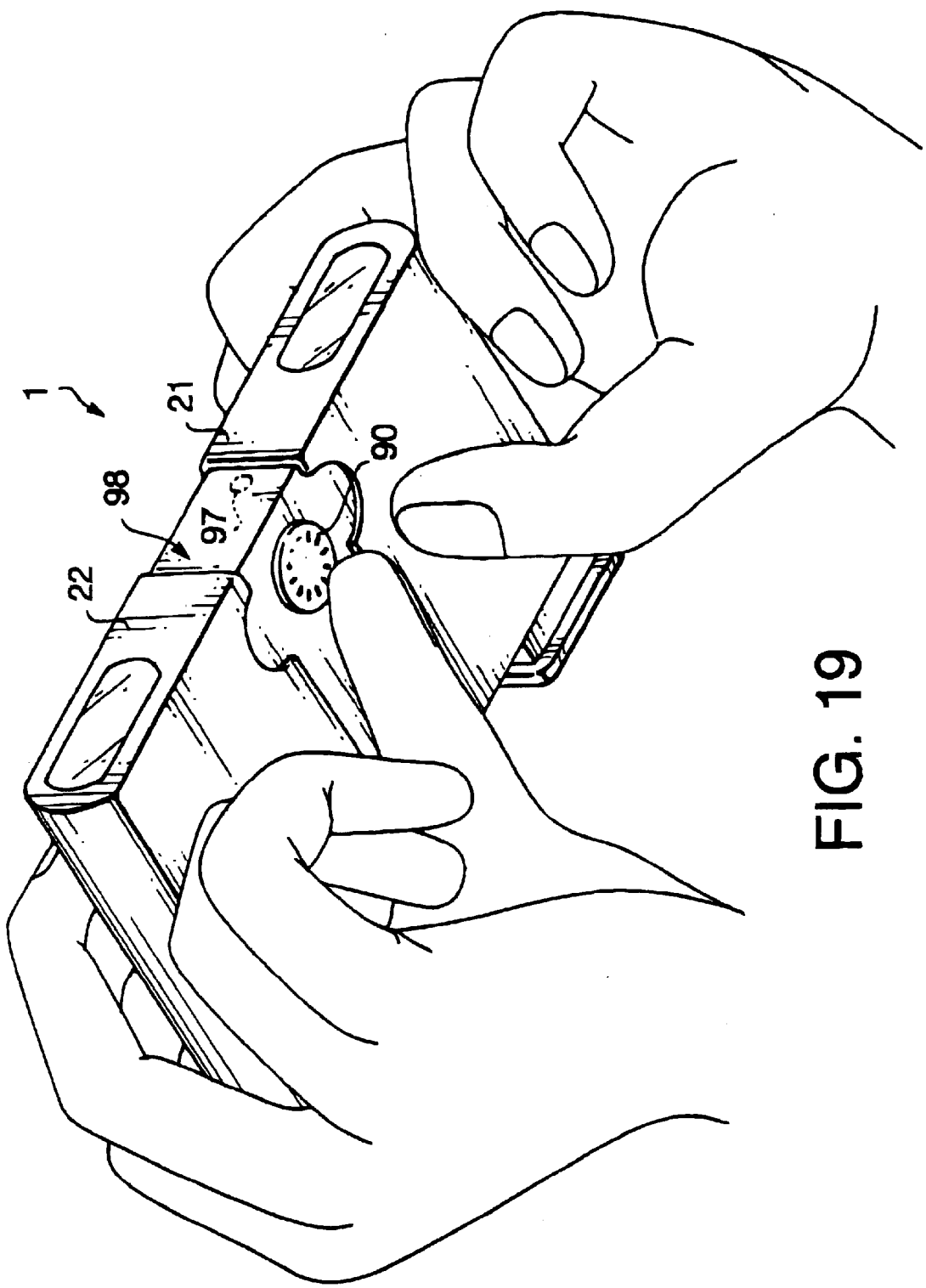
FIG. 19 is a perspective view illustrating the operation of a diopter correcting knob.

FIG. 19 shows a diopter correcting knob 90. A diopter correcting knob 90 is disposed on a bottom surface of the binocular 1 at the center in the width direction thereof. The diopter correcting knob 90 has a disk-like shape to be rotated around a vertical axis.

Figure 20:
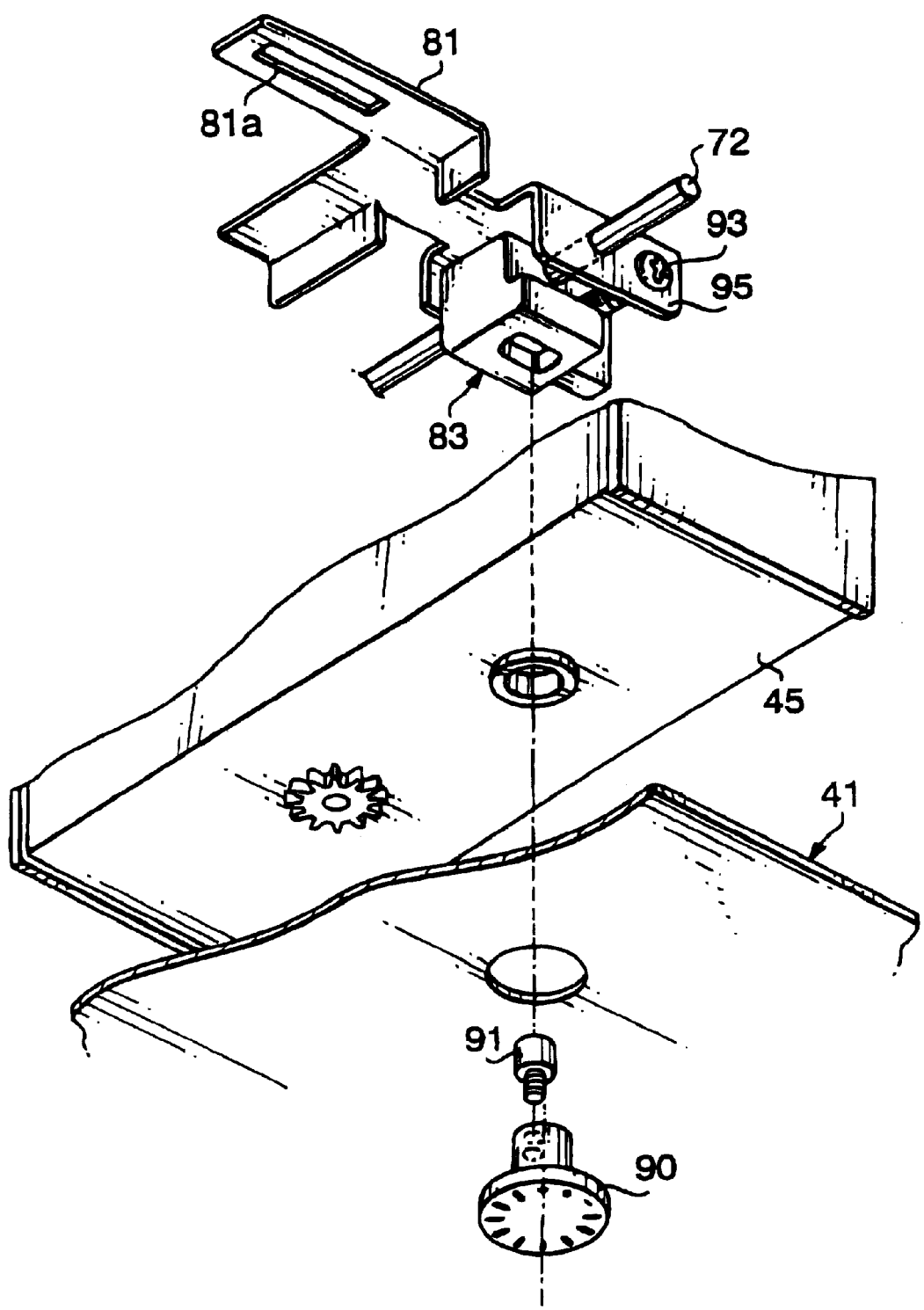
FIG. 20 is a perspective view illustrating a diopter correcting mechanism.

FIG. 20 is a perspective view illustrating the diopter correcting mechanism. In order to convert a rotation of the diopter correcting knob 90 to a linear motion of the blade member 81, a driving pin 91 is mounted on a top of the diopter correcting knob 90 with a predetermined eccentricity relative to a rotational center of the diopter correcting knob 90. A driving member 83 having a concave (or recess) to be engaged with the driving pin 91 is provided to the blade member 81. The driving member 83 is moved integrally with the blade member 81 as will be detailed below.

Figure 21A:
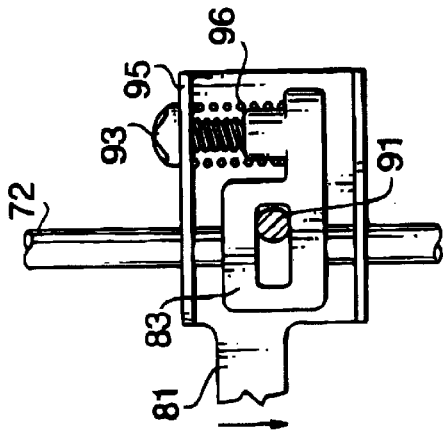
FIGS. 21A and 21B are schematic view showing a blade member and diopter correcting knob.
Figure 21B:
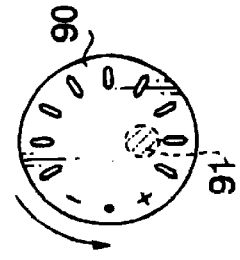
Figure 22A:
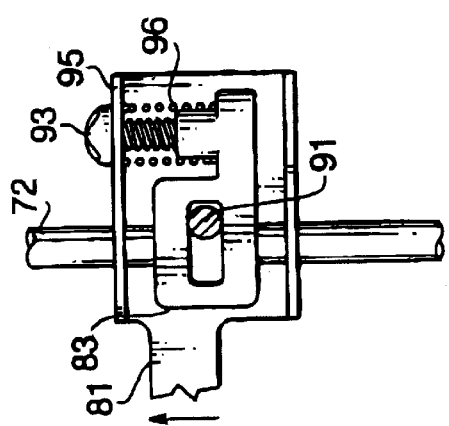
FIGS. 22A and 22B are schematic view showing a blade member and diopter correcting knob; moved clockwise from the FIGS. 21A and 22B position
Figure 22B:
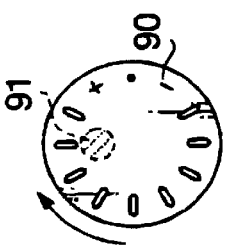
Figure 23A:
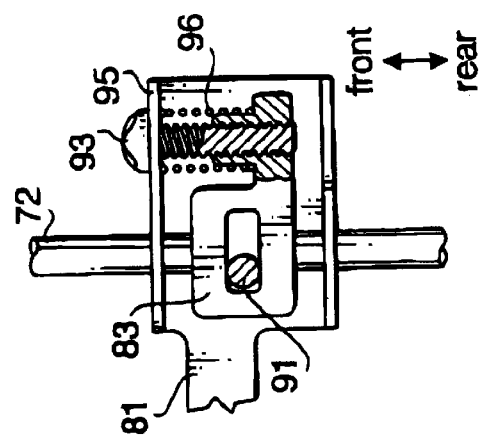
FIGS. 23A and 23B are schematic view showing a blade member and diopter correcting knob; moved clockwise from the FIGS. 21A and 21B positions
Figure 23B:
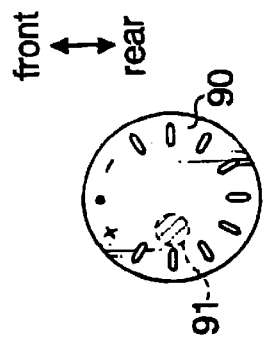

FIGS. 21A, 22A and 23A show movement of the driving member 83 and FIGS. 21B, 22B and 23B show the rotation of the diopter correcting knob 90 corresponding to FIGS. 21A, 22A and 23A. The driving member 83 and the diopter correcting knob 90 are seen from below. As shown in FIGS. 21A and 21B, when the diopter correcting knob 90 is set to 0, the driving pin 91 is located aside the rotational center of the diopter correcting knob 90. As shown in FIGS. 22A and 22B, when the diopter correcting knob 90 is turned clockwise, the driving pin 91 moves frontward with respect to the rotational center of the diopter correcting knob 90, thereby moving the driving member 83 frontward. Thus, the driving pin 91 advances the blade member 81 frontward. As shown in FIGS. 23A and 23B, when the diopter correcting knob 90 is turned counterclockwise, the driving pin 90 moves rearward with respect to the center of rotation of the diopter correcting knob 90, thereby moving the driving member 83 rearward. Thus, the driving pin 91 moves the blade member 81 rearward.

Since the diopter correcting knob 90 is rotatable around an axis perpendicular to the optical axis, the diopter control knob 90 can be provided on the bottom surface of the binocular 1 as shown in FIG. 19. Thus, the diopter correcting knob 90 is easily operated and does not occupy a large space.

FIG. 24 is a partially cutaway view of the binocular. The bottom surface of the diopter correcting knob 90 is flush with an outer surface of the shell 51, so that only symbols such as ".", "+" and "−" (FIG. 21B) and knurled projections protrude downward. Thus, due to a grip between the symbols and projections and a finger of an observer, the diopter correcting knob 90 can be easily operated.

The positional relationship between the driving member 83 and the blade member 81 is adjustable, enabling a fine adjustment of a diopter in a manufacturing process (before shipment of the binocular). That is, as shown in FIG. 20, the blade member 81 has a wall 95 formed in front of the driving member 83, a screw 93 screwed into the driving member 83 through the wall 95 and a spring 96 disposed between the wall 95 and the driving member 83. Accordingly, a position of the blade member 81 relative to the driving member 83 can be minutely adjustable in frontward-forward direction by tightening or loosening the screw 93.

As shown in FIG. 24, a tool insertion hole 97 is formed in the front portion of the center block 45 to allow a tool to be inserted therethrough for operating the screw 93. The tool insertion hole 97 is covered with a decorative seal 98 attached to a front surface of the center block 45. Therefore, it is possible to perform a fine adjustment of a diopter difference by broadening the distance between the casings 21 and 22 (as shown FIG. 19), peeling the decorative seal 98 off, inserting a tool through the tool insertion hole 97 and turning the screw 93.

Figure 25B:
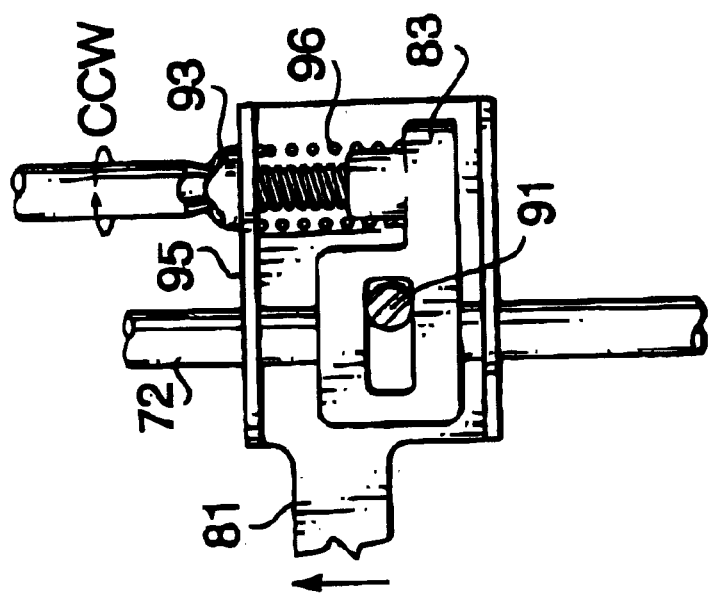
FIGS. 25A and 25B are schematic views showing the positional relationship between a driving member and a blade member in different positions.
Figure 25A:
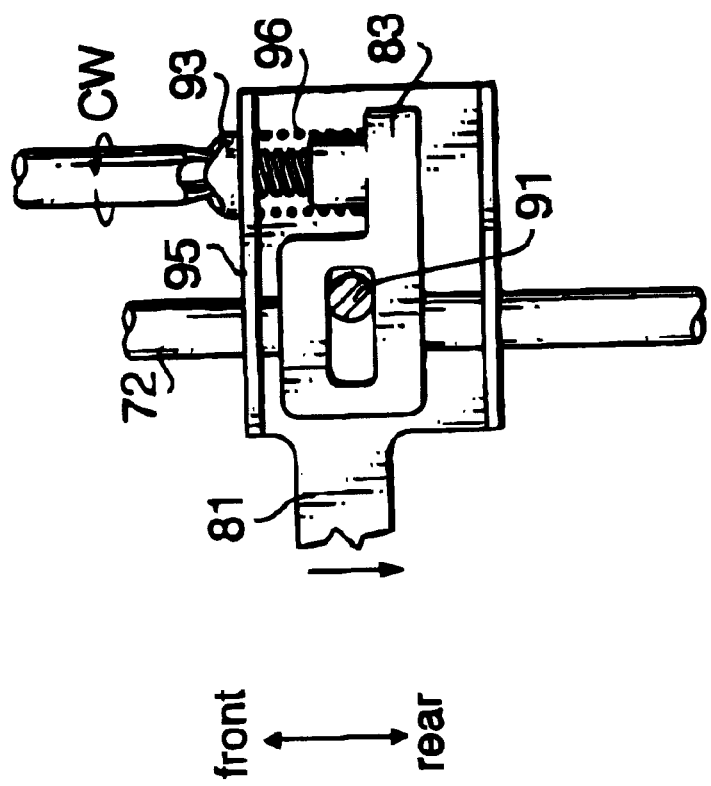

FIGS. 25A and 25B show the positional relationship between the driving member 83 and the blade member 81. As shown in FIG. 25A, when the tool is turned clockwise (CW in FIG. 25A), the blade member 81 is moved rearward with respect to the driving member 83, due to the engagement of the screw 93 and a threaded portion of the driving member 81. On the other hand, as shown in FIG. 25B, when the tool is turned counterclockwise (CCW in FIG. 25B), the blade member 81 is moved frontward with respect to the driving member 83. Thus, the positional relationship between the driving member 83 and the blade member 81 can be adjusted.

As described above, according to the embodiment, the first lens frame 19 (supporting the first lens 11R) and the carrier 62 (supporting the auxiliary prism 12R, the roof prism 13R, the second lens 14R and the eyepiece lens 15R) are guided by the guide shaft 325 in the direction along the optical axis OAR.

This arrangement prevents the misalignment of the optical axes of the lenses of the telescope system 10R due to the movement of the first lens frame 19 and the carrier 62.

Further, the carrier 62 is provided with the abutting portion 626 and the projection 623. The abutting portion 626 abuts the rail portion 321a of the slide frame 32 from below, while the projection 623 contacts the rail portion 321a from above. The abutting portion 626 is elastically deformed, so as not to form a gap between the projection 623 and the rail portion 321a and a gap between the abutting portion 626 and the side wall 321. Thus, the rotation of the carrier 62 about the guide shaft 325 thus be prevented.

Although the structure and operation of a binocular is described herein with respect to the preferred embodiments, many modifications and changes can be made without departing from the spirit and scope of the invention.

The present disclosure relates to subject matter contained in Japanese Patent Application No. HEI 08-271811 filed on Sep. 20, 1996, which is expressly incorporated herein by reference in its entirety.

What is claimed is:

1. A binocular comprising:
   two parallel telescope systems, one of said telescope systems including a first lens unit and a second lens unit, an optical axis of said first lens unit coinciding with an optical axis of said second lens unit;
   a first movable frame supporting said first lens unit;
   a second movable frame supporting said second lens unit; and
   a guide shaft which slidably guides said first movable frame to move between spaced positions along a direction of the optical axis of said first lens unit, said guide shaft also slidably guiding said second movable frame to move between spaced positions along a direction of the optical axis of said second lens unit.

2. The binocular according to claim 1, wherein at least one of said movable frames is provided with a rotation preventing member for preventing rotation of said one of said movable frames about said guide shaft.

3. The binocular according to claim 1, wherein said first lens unit comprises part of an objective system of said one of said telescope systems.

4. The binocular according to claim 3, wherein said first lens unit includes a front-most lens of said objective system.

5. The binocular according to claim 3, wherein said second lens unit includes an eyepiece system of said one of said telescope systems.

6. The binocular according to claim 5, wherein each of said telescope systems further includes an image erecting system, said image erecting system being supported by said second movable frame.

7. The binocular according to claim 6, wherein diopter correction is performed by moving said first movable lens frame and focus adjusting is performed by moving said second movable lens frame.

8. A binocular comprising:
   two parallel telescope systems, one of said telescope systems including a first lens unit;
   a first movable frame supporting said first lens unit;
   a guide shaft supporting said first movable frame, said guide shaft extending in the direction of an optical axis of said first lens unit, and guiding movement of said first movable frame; and
   a rotation preventing member formed on said first movable frame; and
   an abutting member, said rotation preventing member resiliently abutting against and sliding along said abutting member as said first movable frame moves, so that rotation of said first movable frame is prevented.

9. The binocular according to claim 8, wherein said rotation preventing member is spaced from said guide shaft.

10. The binocular according to claim 9, said abutting member comprising a rail member extending in parallel with said guide shaft, wherein said rotation preventing member abuts said rail member.

11. The binocular according to claim 10, wherein said rotation preventing member is elastically deformed by abutting against said rail member, so as to prevent formation of a gap between said rotation preventing member and said rail member.

12. The binocular according to claim 10, further comprising:
   a second lens unit which belong to said one of said telescope systems, the optical axis of said second lens unit being in parallel with the optical axis of said first lens unit;
   a second movable frame supporting said second lens unit, said second movable frame being movable in the direction of an optical axis of said second lens unit; and
   said second movable frame being movably supported by said guide shaft.

13. The binocular according to claim 12, wherein said first lens unit includes a front-most lens of said one of said telescope systems.

14. The binocular according to claim 13, wherein said second lens unit includes an eyepiece system of said one of said telescope systems.

15. The binocular according to claim 14, said binocular including a diopter adjustment mechanism that performs diopter correction and a focus adjustment mechanism that performs focus adjustment, wherein said diopter correction is performed by moving said first movable lens frame and said focus adjustment is performed by moving said second movable lens frame.

16. A binocular comprising:

two parallel telescope systems; each including a plurality of lens units, optical axes of said plurality of lens units being coincident with each other;

a plurality of movable frames respectively supporting said plurality of lens units, and a guide shaft which slidably guides said plurality of movable frames for movement between spaced positions along the direction of said optical axes.

17. The binocular according to claim 16, wherein at least one of said plurality of movable frames is provided with a rotation preventing member for preventing rotation of said at least one of said plurality of movable frames about said guide shaft.

18. The binocular according to claim 1, each of said first and second movable frames being guided by an exterior surface of said guide shaft.

19. The binocular according to claim 16, each of said plurality of frames being guided by an exterior surface of said guide shaft.

20. The binocular according to claim 1, optical axes of each of said two parallel telescope systems being parallel to each other regardless of a position of said first and second lens units of said telescope systems.

21. The binocular according to claim 8, optical axes of each of said two parallel telescope systems being parallel to each other regardless of a position of said first lens unit of each of said two parallel telescope systems.

22. The binocular according to claim 16, optical axes of each of said two parallel telescope systems being parallel regardless of a position of lens units of each of said two parallel telescope systems.

* * * * *